United States Patent

[11] 3,550,670

| [72] | Inventor | Herbert Greenewald, Jr.<br>Columbus, Ohio |
|---|---|---|
| [21] | Appl. No. | 703,206 |
| [22] | Filed | Jan. 11, 1968 |
| [45] | Patented | Dec. 29, 1970 |
| [73] | Assignee | North American Rockwell Corporation<br>Continuation-in-part of application Ser. No.<br>498,046, Oct. 19, 1965, now abandoned. |

[54] MOLD MANUFACTURING METHOD
3 Claims, 15 Drawing Figs.

[52] U.S. Cl. ..................................................... 164/37,
164/43, 164/171
[51] Int. Cl. ..................................................... B22c 15/08,
B22c 1/22
[50] Field of Search ....................................... 164/37, 38,
39, 40, 43, 7; 164/171

[56] References Cited
UNITED STATES PATENTS
2,807,845  10/1957  Sawyer .......................... 164/37

2,877,521  3/1959  Taccone .......... 164/171
2,948,627  8/1960  Feild ........... 164/43X FOREIGN PATENTS
715,972  8/1965  Canada .... ... 164/171

*Primary Examiner*—J. Spencer Overholser
*Assistant Examiner*—John E. Roethel
*Attorneys*—William R. Lane and Daniel H. Dunbar ABSTRACT: A method of manufacturing mold elements for metal casting wherein a mold composition consisting of refractory in powder form and thermosetting resin in prescribed ratio is formed to shape in a closed cavity by the steps of mass compaction above a minimum pressure level and concurrent resin curing at an elevated temperature. Afterwards, the shaped and cured mold composition is heated in a nonoxidizing atmosphere at a temperature in an elevated range a sufficient time to provide a carbonaceous bond as between the powdered refractory particles.

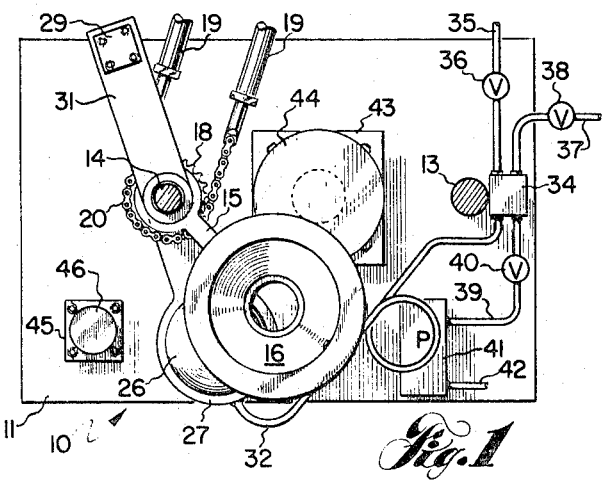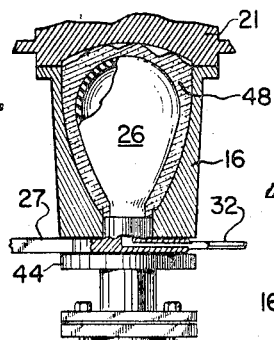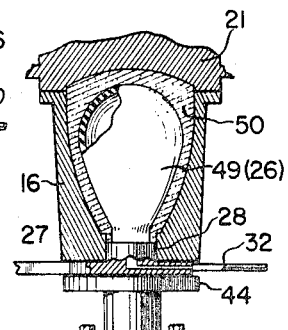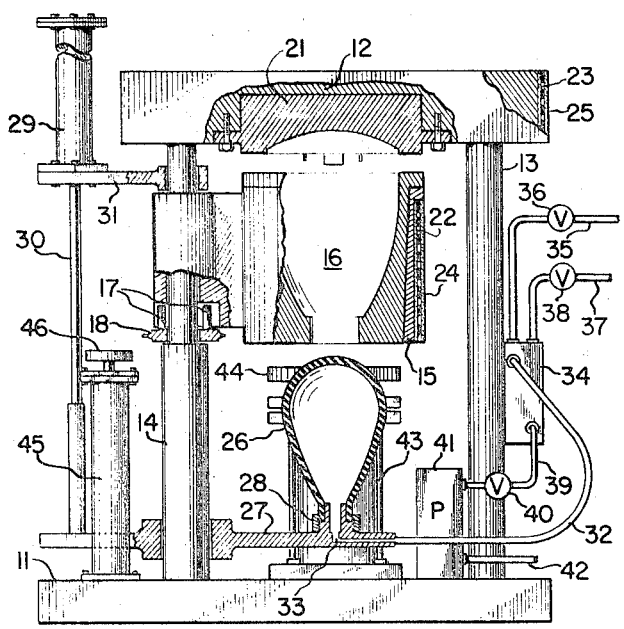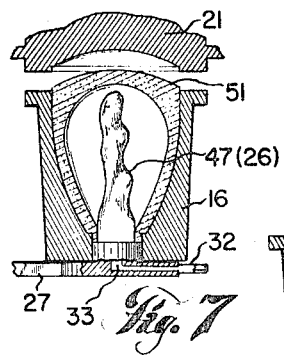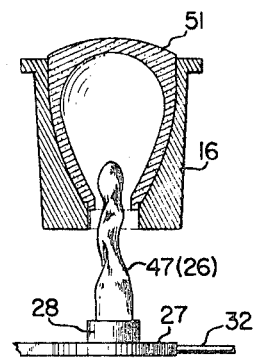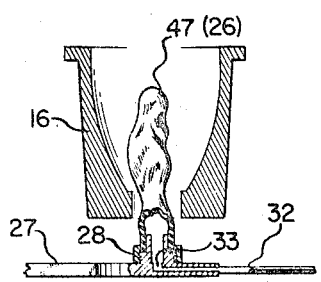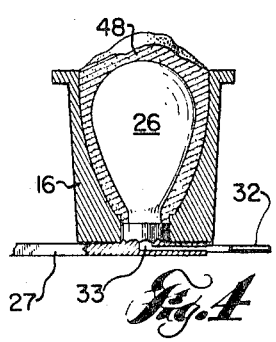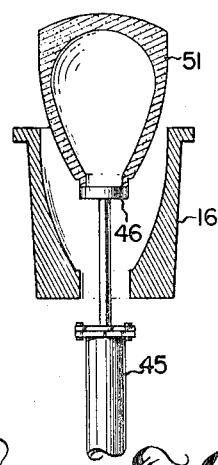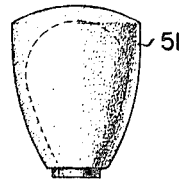

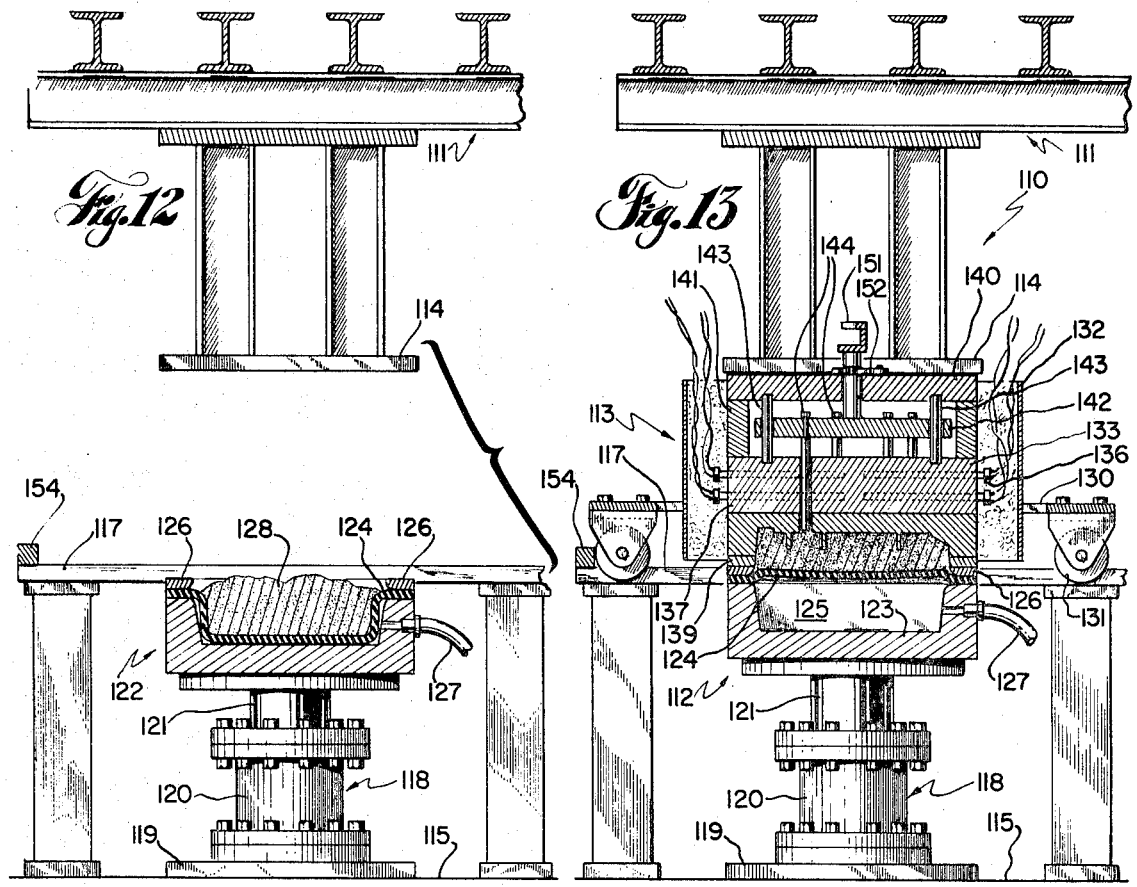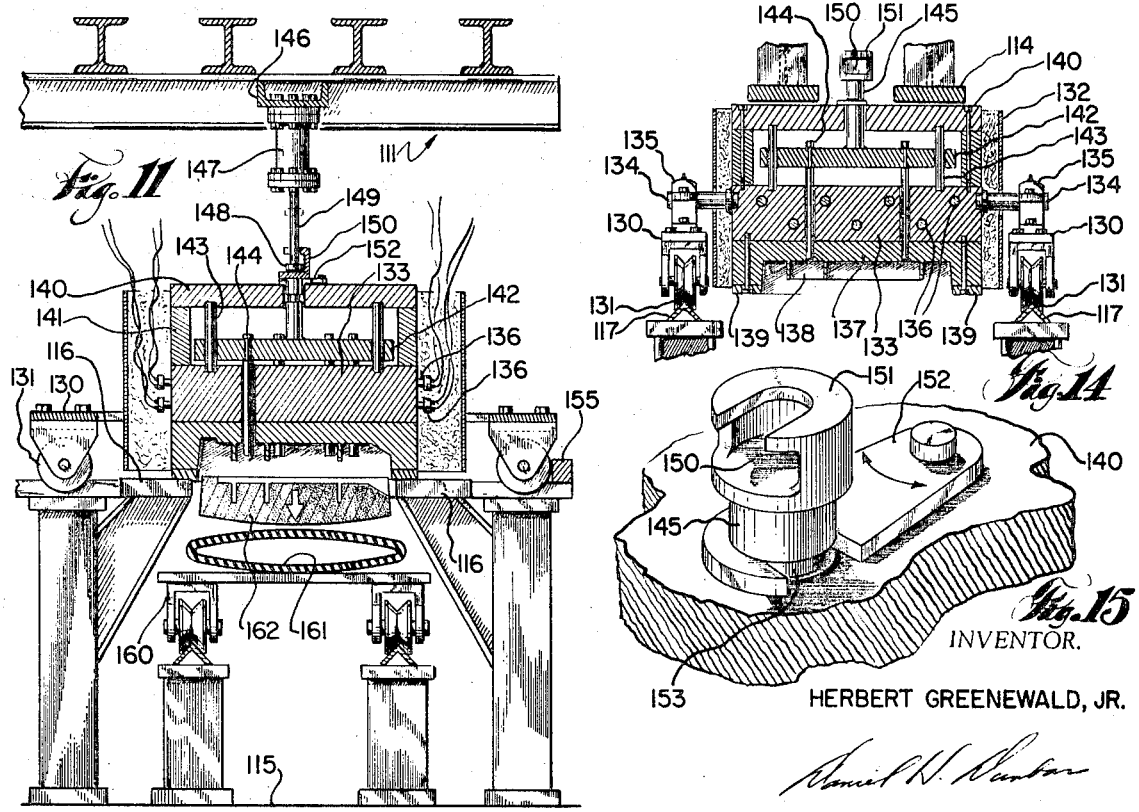
INVENTOR.
HERBERT GREENEWALD, JR.

3,550,670

MOLD MANUFACTURING METHOD

CROSS-REFERENCE

This application is a continuation-in-part of now abandoned application Ser. No. 498,046, filed Oct. 19, 1965 and assigned to the assignee of this application.

SUMMARY OF THE INVENTION

A mold composition consisting on a parts by weight basis of 100 parts of refractory in finely powdered form and 3 to 10 parts of thermosetting resin is shaped in a closed cavity to develop a mold surface of desired casting surface configuration by the steps of mass compaction to a pressure level above approximately 100 p.s.i. throughout and concurrent resin-curing at a temperature substantially above ambient temperatures. After the setting of the thermosetting resin has been substantially completed, the formed mold element is fired in a nonoxidizing atmosphere such as an inert gas or vacuum environment at a temperature in the range of approximately 1000° F. to 1300 F. a sufficient time to develop a carbonaceous bond in the composition as between refractory powder particles. The resulting mold elements exhibit increased compression strength, improved surface definition, and better shape and dimensional tolerance stability, and are particularly well-suited to casting and solidifying molten high-strength aluminum alloys into castings having aircraft structural member configurations.

DESCRIPTION OF THE DRAWINGS

FIGS. 1 and 2 are partially sectioned plan and elevational views respectively of apparatus that is preferred in making large hollow mold cores in accordance with this invention;

FIGS. 3 through 9 are partially sectioned elevational views of a portion of the apparatus of FIGS. 1 and 2 showing the relation of such apparatus to the method of this invention;

FIG. 10 is an elevational view of a representative hollow mold core completed in accordance with the instant invention;

FIGS. 11 through 14 are partially sectioned elevational views of apparatus that is preferred in making large solid mold elements in accordance with this invention; and FIG. 15 is a perspective view detailing a coupling and locking mechanism for controlling mold ejection pin actuation in the apparatus of FIGS. 11 through 14.

DETAILED DESCRIPTION

Apparatus

The method of the instant invention includes a basic step wherein a mold composition essentially comprised of refractory powder and thermosetting resin binder ingredients is subjected to compression above a specified minimum level in a mass compaction sense concurrent with and substantially throughout the period of composition binder curing to thereby develop significantly increased compressive strengths, improved mold surface definition, and better dimensional tolerances and shape stability, particularly with reference to a subsequent carbon-bonded particle condition of the completed mold. The term "mass compaction" as it is used herein is intended to mean that the mold composition (1) is completely confined in a spatial sense relative to the desired core configuration, and (2) additionally, is simultaneously subjected to a pressure condition that is above a prescribed uniform minimum pressure level of approximately 100 p.s.i. throughout its spatial extent. The apparatus detailed in FIGS. 1 through 9 of the drawings is particularly suited for use in developing the required confinement and mass compaction during curing in mold cores having configurations that are hollow and comparatively large as for example the configuration of FIG. 10. In those instances wherein solid (as distinguished from hollow) mold cores, mold halves, and the like are to be fabricated in accordance with this invention, molding equipment such as the preferred apparatus that is shown in FIGS. 11 through 15 of the drawings or even certain conventional injection molding apparatus may be utilized. Conventional core molding equipment such as jolters, impactors, sand blowers, and the like do not develop the mass compaction necessary to the practice of this invention.

Referring to the drawings, the apparatus of FIGS. 1 and 2 is referenced generally as 10 and is comprised of a base 11 and a platen 12 secured to the a base by columns 13 and 14. A die support 15 is slidably and rotatably engaged with an upper reduced-diameter portion of column 14 and carries the insert die designated 16. The interior surface of die 16 essentially corresponds to the external configuration of the mold core to be produced by the practice of this invention. Pins 17 projected vertically from drive gear 18 cooperate with openings in support 15 in a manner whereby support 17 is permitted to be moved in elevation independently of gear 18 (as during the hereinafter described clamping operation) without a loss of rotational drive coupling. An actuating mechanism comprised of dual-acting pneumatic actuators 19 and interconnected chain 20 may be used to rotationally move die support 15 through gear 18 to its various stations relative to column 14.

In those instances wherein the mold core is to have a contoured end configuration an insert die 21 may be combined with platen 12. An electrical resistance heater 22 is provided to develop elevated composition curing temperatures in die 16 and a similar resistance heater 23 is provided for also developing elevated composition curing temperatures in die 21. Insulating covers 24 and 25 are provided in part for safety reasons and in part to improve heater effectiveness. Generally, heaters 22 and 23 should be capable of developing die temperatures in the range of 400° F. to 500° F., approximately, for core compositions which preferably employ a phenolic thermosetting resin as the binder ingredient. If curing of the composition is to be effected outside of die 16, 21, and subsequent to composition i mass compaction, or if thermosetting binder resins which cure at ambient temperatures are used in the core composition, apparatus components 22 through 25 are not required. Electrical energy supply and thermostatic control details are not shown in the drawings because such elements in conventional form are usually satisfactory for the purposes of this invention.

The apparatus of FIGS. 1 and 2 also includes an inflatable bladder 26 for use in developing the required mass compaction pressures in the case of a hollow core construction. Bladder 26 is supported by clamping plate 27 and secured thereto by connector ring 28. The external configuration of connector ring 28 mates with the lower opening of die 16 to provide for die closure; member 28 may also serve to define the mold core configuration in part. An actuating cylinder 29 is provided in the apparatus for the purpose of conveniently raising the lowering clamping plate 27. In this respect the piston rod element 30 of cylinder 29 cooperates with the arm 31 that projects to the opposite side of column 14.

The bladder element 26 is connected to a flexible air line 32 through passageway 33. Supply manifold 34 cooperates with line 32 to provide the required pressure source for bladder 26. Connected to manifold 34 are atmospheric vent line 35 and vent valve 36, pressurized air supply line 37 and supply valve 38, and vacuum line 39 controlled by vacuum valve 40. A vacuum pump 41 cooperates with vacuum line 39 and is exhausted to atmosphere through line 42. The pressures available at supply line 37 must exceed approximately 100 p.s.i.g. for hollow core configurations using generally optimum amounts of core material, and higher pressures are considered desirable. In one specific embodiment of apparatus 10 for producing hollow cores to be sued in vacuum-casting an 8 pound aluminum alloy nose cone having an approximate maximum diameter of 15 inches, an air supply pressure of 400 p.s.i.g. was used to develop the required core composition mass compaction.

The apparatus of FIGS. 1 and 2 further includes clamping cylinder 43 and the pressure plate attached to projecting reciprocable rod 44. A core ejection cylinder 45 and the pressure plate attached to reciprocable rod 46 are also included. The drawings do not disclose details of compressed air supply and valving for the various cylinder piston components. Such are considered within the capability of those skilled in the art. However, it should be noted that the clamping forces developed by cylinder 43 from its pressurized air supply must be sufficient to maintain clamped core dies 16 and 21 in a completely closed condition when the hereinafter described mass compaction pressure step is practiced with respect to the contained refractory and thermosetting resin binder core composition.

Whereas the apparatus illustrated in FIGS. 1 through 9 is suited to developing mass compaction of the mold material concurrent with curing the included thermosetting resin at an elevated temperature in mold shapes having a hollow configuration, alternate apparatus is generally preferred for developing the necessary mass compaction simultaneous with resin-curing in mold elements having solid shapes. Such alternate apparatus is shown in FIGS. 11 through 15 and may be operated to obtain an additional advantage in that if the heated die is continuously maintained at an elevated temperature over a prolonged period of time, those processing delays that are otherwise associated with alternate die heating and die cooling steps may be eliminated. The apparatus of FIGS. 11 through 15 also offer advantages in that the resulting formed mold elements may be subsequently carbonized with greater assurance of obtaining improved surface definition, compressive strength, shape stability, and dimensional tolerance properties in the finally fired condition.

As shown in the drawings, the alternate apparatus is referenced generally as 110 and is comprised in part of a framework 111 made of conventional structural members and having multiple work stations. In addition, apparatus 110 includes a compression loading assembly 112 and a movable die assembly 113. The framework 111 includes an up-stop portion 114 that is fixed relative to floor support 115 and relative to the other parts of the framework. A down-stop 116 is included in assembly 111 as well as the rails 117 for supporting die assembly 113. The assemblies designated 111 and 112 function in the manner of a press wherein work is accomplished at the region of die assembly 113.

Compression loading assembly 112 is illustrated in two successive operating conditions in FIGS. 12 and 13. Such assembly includes a clamping actuator 118 supported by base 119 and having a cylinder 120 and piston 121 that cooperate with loading head 122. Head 122 includes a rigid housing 123 and flexible diaphragm 124 that define a plenum chamber 125. A clamping ring 126 secures diaphragm 124 to housing 123 in a conventional manner. Depending on desired curing temperatures, diaphragm 124 may be fabricated of Buna-n or silicone rubber. Evacuation/pressurization line 27 cooperates with plenum chamber 125. In the FIG. 12 illustration, plenum 125 is evacuated by valving a vacuum condition from a conventional vacuum source (not shown) through line 127. Mold composition 128 at ambient temperature is placed into loading head 12 112 in the FIG. 12 condition for subsequent injection into an inverted mold cavity included in die assembly 113. In the FIG. 13 illustration, an elevated pressure condition (e.g., air at 250 p.s.i.) is introduced into plenum 125 through line 127 to force the preloaded mold composition into die assembly 113 to obtain mass compaction concurrent with immediately initiated resin-curing at the elevated temperature of the die. Die assembly 113 is movably carried by carriage 130 having the wheel elements 131 that engage rails 117. Carriage 130 rotatably supports frame 132 having the die support 133 secured thereto. Frame 132, connected die support 133, and the various elements secured to die support 133 are rotatably carried on carriage 130 by the trunnions 134 and pillow block bearings 135 shown in FIG. 14. Die support 133 includes inserted cartridge-type resistance heater elements 136 that are connected by appropriate leads to a conventional electrical energy power supply (not shown). The lowermost surface of die support 133 (in its FIGS. 11 and 13 condition) contacts a flat exterior surface of the metallic die 137 for effecting efficient heat transfer. The surface of cavity 138 is provided with a configuration, generally machined, that corresponds to the shape or contour desired for the casting surface of the mold element to be formed. Metallic die 137, which is usually nickel-plated brass or bronze, is secured to die support 133 by framelike die holder 139 and by conventional threaded fastener devices (not shown). The upper portion of die assembly 113 includes a back pressure plate 140 that cooperates with spacer frame 141 and that is secured in position by conventional threaded fastener devices (not shown) cooperating with die support 133. An ejection plate 142 that cooperates with guide pins 143 and that carries ejection pins 144 is provided within the space defined in part by spacer 141. When the ejection plate rod 145 is placed in a raised condition (FIG. 13), ejection pins 144 are fully retracted from within die cavity 138. When ejection plate 142 is actuated to a lowered condition (FIG. 11), ejection pins 144 project through cooperating passageways in die support 133 and die 137 and into die cavity 138 a sufficient distance to eject a completed mold element from the die assembly.

Apparatus details for actuating ejection plate 142 are shown in part in FIG. 11 and in part by FIG. 15. Crossbeam 146 is secured to framework 111 an and carries conventional actuator 147 having a piston head 148 at the free end of rod 149. Piston head 148 and rod 149 engage the slot and recess region 150 provided in coupling member 151. Member 151 is preferably rotatably attached to the free end of ejection plate rod 145. See FIG. 15. A rotatable latch 152 carried by pressure plate 140 is arranged to engage the recessed groove 153 in rod 145 to retain ejection plate 142 and ejection pins 144 in the FIG. 13 nonprojecting relation to die cavity 138 during the mold-forming steps.

Stops 154 and 155 are secured to rails 117 to properly position die assembly 113 at the different work stations for apparatus 110. The work station illustrated in FIG. 11 is adjacent to the work station illustrated in FIGS. 12 and 13 and is used primarily in connection with die assembly preparation and mold ejection. The die assembly is moved from the FIG. 11 position along rails 117 to the work station illustrated in FIGS. 12 and 13 for mold material injection and for concurrent mass compaction and resin-curing. The step required for charging compression loading assembly 112 with the material charge 128 precedes both the positioning of die assembly 113 over loading head 122 and the subsequent clamping of the entire assembly by clamping actuator 118. Transfer equipment 160 (FIG. 11) may be provided for transferring the completed mold assembly from apparatus 110 for subsequent processing. Also, a conventional inflatable cushion 161 may be provided to minimize the possible damaging of the completed mold assembly during ejection from assembly 113.

Method

FIGS. 3 through 9 of the drawings illustrate the method of the invention in relation to the apparatus shown in FIGS. 1 and 2. FIGS. 3 through 5 essentially disclose apparatus preparation for the principal method step. FIG. 6 discloses the step wherein the mold core composition is subjected to mass compaction and simultaneous curing. FIGS. 7 through 9 relate to steps for removing the cured mold core from apparatus 10. No drawing is provided with respect to the subsequent firing step that develops the previously-mentioned carbonaceous bond as between refractory particles.

As shown in FIG. 3, the core die 16 is made ready for use by inserting bladder 26 in its collapsed condition 47 into the die interior through the die lower opening. This preliminary operation is normally accomplished by evacuating the bladder interior by means of vacuum pump 41 and its connection to the bladder interior through passageway 33 and lines 32 and 39. Valves 34 and 36 are closed in connection with the evacuation. The supporting plate 27 is brought into engagement with the underside of die 16 by proper actuation of cylinder 29. The preliminary step is normally accomplished with die support 15 at an intermediate station or position between ejection cylinder 45 and clamping cylinder 43. See FIG. 1.

FIG. 4 shows the apparatus arrangement at the time die 16 is charged with unpolymerized core composition 48. At the time the die is filled with the desired quantity of material, bladder 26 is preferably maintained in its normal configuration. The exterior shape of the noninflated bladder element preferably corresponds approximately to the desired configuration of the hollow interior of the cured mold core. The unpolymerized core composition 48 may be distributed within the unoccupied interior of the die 16 manually and in a generally uniform manner. Details respect to core compositions are provided hereinafter.

The first step in the basic method involves developing proper core composition confinement and such may be accomplished in apparatus 10 by moving supported die 16 and the cooperating bladder member 26-clamping plate 27 combination, together with included composition 48, into proper engaged relation with die portion 21 and platen 12, and clamping such elements in their assembled relation by means of cylinder 43 and cooperating pressure plate. Alignment is normally accomplished by means of actuator 19 and connected drive components. FIG. 5 shows the apparatus primary elements in proper clamped relation. As previously mentioned, the clamping forces developed by clamping cylinder 43 are sufficient to prevent the mass compaction pressures subsequently developed by inflation bladder 26 from opening the die interior and losing the otherwise obtained composition confinement.

FIG. 6 illustrates the next basic step of the invention in terms of operation of apparatus 10. Pressurized air at pressure levels sufficient to produce the required mass compaction (i.e., above 100 p.s.i.g.) in composition 50 is conducted through line 32 to the interior of inflatable bladder 26. Such action is accomplished concurrent with die portions 16 and 21 being in a fully clamped condition. Conventional clamping cylinder 43 is operated in a normal manner to accomplish the latter condition. The temperature (and time) required for obtaining curing of the core composition in die 16, 21 by the use of heater elements 22 and 23, is established largely by the nature of the core composition thermosetting resin binder ingredients actually employed. Details with respect to particular core compositions and the temperature, times, mass compaction, an and pressures utilized are provided below in this specification.

With respect to the method, it should be noted that mass compaction has two important aspects. First, the developed mass compaction pressure must be above a uniform minimum pressure throughout all of compressed core composition 50; such is in part attained by plasticity of the completely pressurized mold composition. Second, the closed core die elements, together with the pressurized bladder component, operate to physically confine the core composition and thus in part also obtain the distributed pressure in a mass compaction sense. The minimum satisfactory pressure for obtaining significantly increased core cured compressive strengths appear to be approximately 100 p.s.i.g. when apparatus of the type shown in the drawings is used. In instances where cores of considerable depth have been formed in compression dies, pressures up to 5,000 p.s.i. on the composition upper surface have been required to develop comparable end results.

After curing is completed, the apparatus components are disengaged from their FIG. 6 condition for core removal. FIG. 7 illustrates the bladder 26 in an evacuated condition 47 prior to withdrawal from the core interior. FIG. 8 shows the bladder substantially withdrawn from the core interior by the elevational displacement of clamping plate 27 relative to die support 15. Referring to FIG. 9, die 16 with retained completed core 51 may be rotated about column 14 into aligned relation with ejection cylinder 45. Piston rod 46 of that cylinder is actuated relative to die 16 and causes the core to be ejected from the die interior. FIG. 10 illustrates the completed mold core 51 after withdrawal from the die interior.

An added step is involved in this invention to make a cured core 51, when containing a hereinafter-described preferred phenolic or furfuryl alcohol system thermosetting resin as the core composition binder ingredient, particularly well-suited for use in vacuum-casting large, precisely-dimensional, smooth-surfaced, thin-walled metal parts. Such step involves heating the cured core in a nonoxidizing (vacuum or inert gas) atmosphere to an elevated temperature to thereby form a carbonaceous bond from the cured resin ingredient and as between the included refractory particles. Generally, the elevated temperature to be attained in the core is in the range of approximately 1000° F. to 1300° F. This added step, however, is not considered desirable in connection with the making of cores having compositions that include urea, melamine, or the like thermosetting resins as the binder. In firing at the indicated temperature range, such resins fail to yield the carbonaceous bond considered necessary for developing core compressive strengths compatible with vacuum-casting comparatively large hollow metal parts.

It should also be noted that variations of the above-described process can be used advantageously. More specifically, the mass-compaction and simultaneous composition confinement step can be practiced with conventional core compositions containing silica sand or a similar granular material as the refractory ingredient to develop significantly increased core compressive strengths. Since compressive strength increases in the general ratio of 2:1 are obtained for equal thermosetting resin binder contents, practice of the mass-compaction and confinement step with conventional core compositions results in a pronounced reduction in the amount of binder required to develop a specified strength.

FIG. 13 of the drawings illustrates the required simultaneous mass-compaction and curing method steps of this invention as related to the apparatus of FIGS. 11 through 15. FIGS. 11 and 12 illustrate apparatus conditions preparatory to and following the concurrent mass-compaction and curing. Die assembly 113, while being maintained with its die member in a heated condition at the desired elevated temperature for curing the mold composition being used, is prepared for subsequent material loading at the apparatus work station illustrated in FIG. 11. During preparation the assembly portions fixedly secured to frame 132 and die support 133 are preferably rotated on trunnions 134 to an inverted condition relative to the condition shown in the drawings. Ejection pins 144 are moved to a fully retracted condition (FIG. 13) and locked in place by latch member 152. The surface 138 of the cavity in die 137 is normally coated with a conventional mold release agent such as a wax or silicone oil prior to subsequent material loading.

Plenum chamber 125 is evacuated to place rubber diaphragm 124 in its Fig. 12 retracted position and a predetermined quantity of unpolymerized mold composition material 128 at room or ambient temperature is placed in loading head 122. Loading head 122 and the material are both positioned to have slight clearance below the lowermost surface of die holder 139. Die assembly 113, with heated die support 133 and heated die 137 in their inverted FIG. 11 condition, is moved along rails 117 to the apparatus work station illustrated by FIGS. 12 and 13. Clamping actuator 118 is activated to raise loading head 122 and clamp the die assembly elements connected to die support 133 against up-stop portion 114 of framework 111. It is required that the clamping force developed by actuator 118 and applied to loading head 122 exceed the reaction force that is subsequently developed when plenum chamber 125 is pressurized by means of evacuation/pressurization line 127. It is common that a gas pressure of approximately 250 p.s.i.g. be introduced into chamber 125 to accomplish both injection of the composition into the cavity of die 137 and mass-compaction of the so-injected material during curing; the clamping force developed by actuator 118 is commonly based on a pressure equivalent of 50 p.s.i.g. above the pressure condition introduced in plenum 125 for the projected area involved.

Curing of mold material 128 commences with the injection of such material into preheated cavity 138 by the action of diaphragm 124 and continues during the period of continued mass compaction. With respect to the hereinafter-detailed zircon powder and catalyzed phenolic thermosetting resin mold compositions, a die temperature in the general range of 400° F. to 500° F. has been utilized concurrent with mass compaction at 250 p.s.i. for a period of time varying from 20 to 40 minutes to obtain the required curing. In the case of the example zircon powder and acid-catalyzed furfuryl alcohol thermosetting resin mold compositions, die 137 has been maintained at a temperature in the range of 150° F. to 250° F. for periods of time ranging from 25 minutes to 50 minutes, both at the mass compaction pressure of 250 p.s.i.g. or above, to obtain the desired curing prior to firing. As previously indicated, mass-compaction pressures of less than approximately 100 p.s.i. are considered unsatisfactory for the purposes of this invention.

After the mold element is substantially cured, the mass compaction pressure developed through bladder 124 and the clamping force developed by actuator 118 are released and die assembly 113 is moved from the work station of FIGS. 12—13 to the work station illustrated by FIG. 11 for ejection purposes. Mold ejection is accomplished by activating actuator 147 to a force ejection plate 142 and ejection pins 144 downward to their illustrated FIG. 11 position. Such actuation forces cured mold element 162 from die assembly 113 for subsequent processing. As previously indicated, the added step involves firing the cured mold element in a nonoxidizing (vacuum or inert gas atmosphere) to an elevated temperature generally in the range of approximately 1000° F. to 1300° F. a sufficient time to form a carbonaceous bond as between the included refractory particles.

Composition

In order to provide mold elements that are particularly well-suited without further surface machining or the like for use in casting comparatively large, precisely-dimensioned, smooth-surfaced, thin-walled metal parts of an aluminum alloy or the like, a preferred composition is utilized in connection with the above-described method to develop required mold compressive strengths and other desirable core properties in the completed end products. For this purpose the following core composition mixture is preferred:

| Ingredient: | Parts by weight |
|---|---|
| Refractory powder | 100 |
| Catalyzed thermosetting resin | 3–10 |

As used herein, the term "refractory powder" means a refractory form that has a flourlike consistency or feel similar to general purpose milled food grains (e.g., wheat, rye, etc.) or cosmetic powders and that generally corresponds to −200 mesh (commercial standard) or finer in fineness. Such powder form is readily distinguishable from conventional core refractory forms such as known core sands by the consistency quality and generally also by the fineness quality. As to chemical form, it is necessary that the refractory powder be physically and chemically stable at the molten metal casting temperatures to be encountered and be chemically nonreactive with the resin catalyst system used. Generally, oxide, carbide, silicate, and even complex molecule forms of the refractory are suitable for most applications of this invention. Aluminum oxide, silicon dioxide, zirconium silicate, and the like are suitable particular refractories for mold elements to be used in casting component parts from various aluminum alloys.

The catalyzed thermosetting resin ingredient used in the mold composition must be selected to develop a carbonaceous bond by use of the added method step. Conventional thermosetting resin systems such as amine-catalyzed and acid-catalyzed phenolic and furfuryl alcohol are suitable for the purpose; urea resins and melamines generally are not desirable if a high core fired compressive strength is to be attained. Generally, the above-referenced phenolic resins are cured at a temperature of approximately 400° F.; furfuryl alcohol resin, on the other hand, can be cured at room temperatures over prolonged periods of time (e.g., up to 24 hours) but may optionally be cured at elevated temperatures of approximately 200° F. in considerably less time. Care may be required in the selection of the resin catalyst to avoid incompatibility with the refractory powder ingredient; acid catalysts, for instance, are generally incompatible with alumina.

The herein-described invention has been employed to make mold elements using the following Example compositions, particularly because of the requirement of the added step of heating the cured mold element to develop increased fired compressive strength, improved surface definition, and better shape and dimensional tolerance stability, each through the resulting superior carbonaceous bond between all included refractory particles.

EXAMPLE I

| Ingredient: | Parts by weight |
|---|---|
| Zirconium silicate (ZrSiO$_4$), −325 mesh commercial grade | 100.00 |
| Phenolic resin and amine catalyst | 6.38 |

In this Example the dry phenolic resin with amine catalyst ingredient was dissolved in alcohol for grinding/mixing with the zircon flour to obtain uniform particle coating. After injection in an alcohol-free condition into a die cavity, the composition was cured at a temperature of approximately 450° F. for a period of 35 minutes using continuous mass compaction at a pressure throughout of 250 p.s.i.

EXAMPLE II

| Ingredient: | Parts by weight |
|---|---|
| Zirconium silicate (ZrSiO$_4$), −325 mesh commercial grade | 100.00 |
| Phenolic resin and amine catalyst | 5.0 |

In this Example the dry phenolic resin with amine catalyst ingredient was dissolved in alcohol for grinding/mixing with the zircon flour to obtain uniform particle coating. After injection in an alcohol-free condition into a die cavity, the composition was cured at a temperature of approximately 450° F. for a period of 25 minutes using continuous mass compaction at a pressure throughout of 250 p.s.i.

EXAMPLE III

| Ingredient: | Parts by weight |
|---|---|
| Zirconium silicate (ZrSiO$_4$), −325 mesh commercial grade | 100.00 |
| Furfuryl alcohol and hydrochloric acid catalyst | 6.22 |

In this Example the furfuryl alcohol resin and hydrochloric acid catalyst mixture was combined with the powdered zirconium silicate by grinding/mixing to obtain uniform particle coating. The prepared composition, having a catalyst to resin ratio of 0.053, was cured in a closed cavity at a temperature of approximately 160° F. for a period of 30 minutes using continuous mass compaction at a pressure throughout of 250 p.s.i.

EXAMPLE IV

| Ingredient: | Parts by weight |
|---|---|
| Zirconium silicate (ZrSiO$_4$), −325 mesh commercial grade | 100.00 |
| Furfuryl alcohol and hydrochloric acid catalyst | 6.36 |

In this Example the furfuryl alcohol resin and hydrochloric acid catalyst mixture was combined with the powdered zirconium silicate by grinding/mixing to obtain uniform particle coating. The prepared composition, having a catalyst to resin ratio of 0.053, was cured in a closed cavity at a temperature of approximately 190° F. for a period of 30 minutes using continuous mass compaction at a pressure throughout of 250 p.s.i.

EXAMPLE V

| Ingredient: | Parts by weight |
|---|---|
| Zirconium silicate (ZrSiO$_4$), −325 mesh commercial grade | 100.00 |
| Furfuryl alcohol and hydrochloric acid catalyst | 4.74 |

In this Example the furfuryl alcohol resin and hydrochloric acid catalyst mixture was combined with the powdered zirconium silicate by grinding/mixing to obtain uniform particle coating. The prepared composition, having a catalyst to resin ratio of 0.053, was cured in a closed cavity at a temperature of approximately 220° F. for a period of 30 minutes using continuous mass-compaction at a pressure throughout of 250 p.s.i.

EXAMPLE VI

| Ingredient: | Parts by weight |
|---|---|
| Zirconium silicate (ZrSiO$_4$), −325 mesh commercial grade | 100.00 |
| Furfuryl alcohol and hydrochloric acid catalyst | 5.79 |

In this Example the furfuryl alcohol resin and hydrochloric acid catalyst mixture was combined with the powdered zirconium silicate by grinding/mixing to obtain uniform particle coating. The prepared composition, having a catalyst to resin ratio of 0.053, was cured in a closed cavity a at a temperature of approximately 220° F. for a period of 40 minutes using continuous mass-compaction at a pressure throughout of 250 p.s.i.

Several mold elements made of each of the above Example compositions were cured substantially as detailed and afterwards were fired in a nonoxidizing atmosphere to a temperature of 1300° F. to develop a carbonaceous bond between the refractory ingredient particles. The following shrinkage and flatness values were obtained from measurement of the fired mold elements:

| Composition: | Maximum percent total shrinkage | Maximum flatness deviation in 20″ of length |
|---|---|---|
| Example I | 1.31 | 0.003″−0.014″ |
| Example II | 1.10 | 0.003″−0.005″ |
| Example III | 0.90 | <0.003″ |
| Example IV | 0.96 | <0.003″ |
| Example V | 0.84 | 0.003″−0.012″ |
| Example VI | 0.92 | <0.003″ |

Increased mass-compaction pressures and reduced resin content to refractory ingredient ratios in the composition function to improve shape retention and shrinkage properties in the finally fired mold element.

Mold elements made in accordance with the instant invention may be readily removed from solidified castings. It is only necessary to expose the casting and mold element combination to an oxygen-containing atmosphere (e.g., air) at a temperature in the range of 800° F. to 1000° F. The developed carbonaceous bond between refractory particles is destroyed and the released refractory ingredient may then be conveniently processed for subsequent reuse.

We claim:
1. A method of making a mold element prior to subsequent processing for use in a heated condition above approximately 1100° F. in connection with casting and solidifying molten metal, comprising the sequential steps of:
   a. Injecting a quantity of mold element composition consisting on a weight basis of 100 parts of powdered refractory thoroughly mixed with 3 to 10 parts of unpolymerized thermosetting resin and combined catalyst at ambient temperature into contacting relation with a die surface maintained at an elevated temperature substantially in excess of said ambient temperature;
   b. Simultaneously with said Step (a), initially compressing said mold element composition in said die uniformly throughout to a mass-compaction pressure above a minimum of approximately 100 p.s.i. and curing said mold element composition thermosetting resin at said mass-compaction pressure initially and until after said composition thermosetting resin has passed from a condition of thermoplastic liquidity to a condition of substantial polymerization to form a cured mold element;
   c. Removing said cured mold element from said die; and
   d. Heating said cured mold element in a nonoxidizing atmosphere after removal from said die to a temperature in the range of approximately 1100° F. to 1300° F. to form a carbonaceous bond as between particles of said powdered refractory from said cured mold element composition thermosetting resin.

2. The invention defined by claim 1, wherein said die surface is maintained at a temperature in the range of approximately 150° F. to 550° F. during the period of accomplishing said Steps (a) and (b).

3. The invention defined by claim 1, wherein said quantity of mold element composition is injected by generally upward movement in connection with Step (a) into contacting relation with a die surface maintained at an elevated temperature substantially in excess of said ambient temperature and positioned above said quantity of mold element composition.